H. W. Warner,
Steam-Engine Valve-Gear.
Nº 48,120.   Patented June 6, 1865.
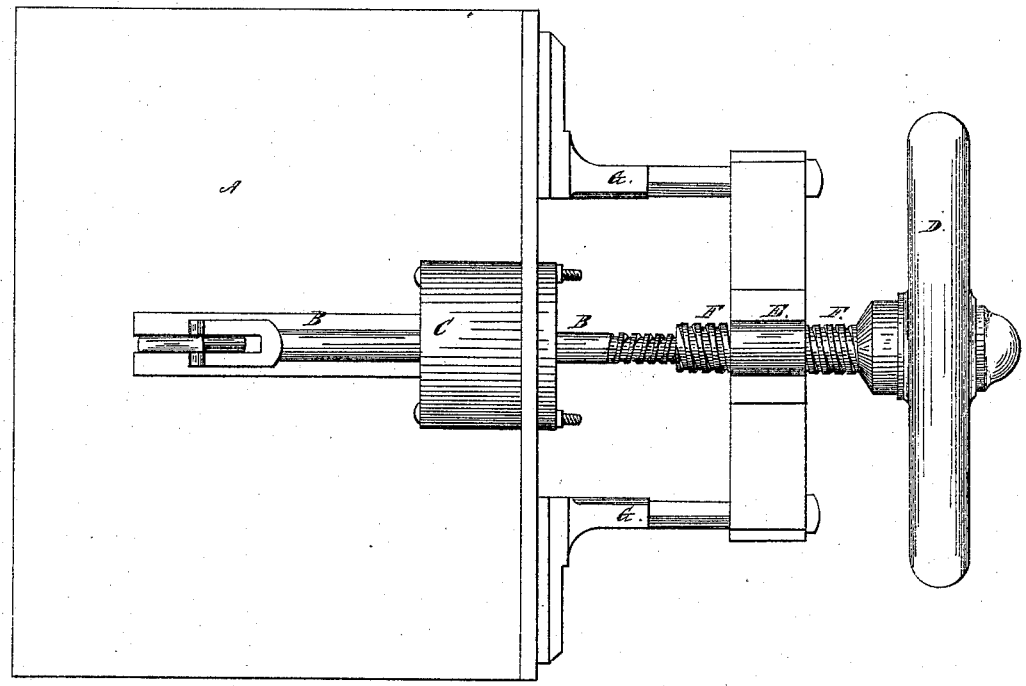
Witnesses.
P. T. Dodge
Geo. Burgess
Inventor.
H. W. Warner
By his atty's
Smith & Dodge

UNITED STATES PATENT OFFICE.

H. W. WARNER, OF GREENFIELD, MASSACHUSETTS.

IMPROVEMENT IN THROTTLE-VALVE GEAR.

Specification forming part of Letters Patent No. 48,120, dated June 6, 1865.

*To all whom it may concern:*

Be it known that I, H. W. WARNER, of Greenfield, in the county of Franklin and State of Massachusetts, have invented a new and useful Improvement in the Mode of Operating the Throttle-Valves of Locomotive-Engines; and I do hereby declare the following to be a full and exact description of the same, reference being had to accompanying drawing, which represents a plan view of my device.

The nature of my invention consists in an application of a double screw, one right-hand and one left-hand, but so combined that they both tend to produce motion in the same direction.

That others may understand the construction and operation of my invention, I will particularly describe it.

A is a part of the steam-dome of the boiler. B is the stem which operates the throttle. C is a stuffing-box. D is the hand-wheel. E is the nut in which the hand-wheel screw F is fitted.

The internal arrangements embracing the throttle-valve and attachments are constructed in any improved manner, and do not need any description at this time. The stem B, however, is constructed with a screw-thread upon its outer end, which screw-thread is fitted to an internal or female screw in the sleeve F, which forms the hand-wheel screw. The sleeve F, then, is provided with a male and female screw, the one being right-hand and the other left-hand. The nut E is elevated from the side of the boiler by the pillars G, in order to allow more space for the operation of the screws.

From the description of the parts, it will be readily seen that when the hand-wheel is turned—say to the right—the screw being right-handed causes the wheel to run in toward the boiler, while the screw B, being left-handed, is caused to run out of the sleeve F, and also move toward the boiler, thus increasing the movement of the stem in that direction in proportion to the pitches of the two threads B and F, the resulting movement being the sum of the pitches. When the motion of the hand-wheel is reversed, the effect is reversed also. As the screw F runs outward in its nut E the stem B is caused to run up into the sleeve F, thus adding its motion to that of the sleeve F. In this way it is possible to operate the throttle of a locomotive-engine with all the rapidity that can be required, while the use of a screw gives the engineer much better control of the valve, enabling him to adjust it to much nicer degrees than is possible with a lever.

Having described my invention, what I desire to secure by Letters Patent, is—

The combination and arrangement of the male and female screw F, male screw B, and nut E, for the purpose of operating and controlling the throttle-valve of a steam-engine, substantially as herein set forth.

H. W. WARNER.

Witnesses:
    W. GRISWOLD,
    HENRY BARBER.